Aug. 21, 1945.    H. R. BATCHELDER    2,383,363
CHEMICAL PROCESS
Filed Feb. 27, 1943
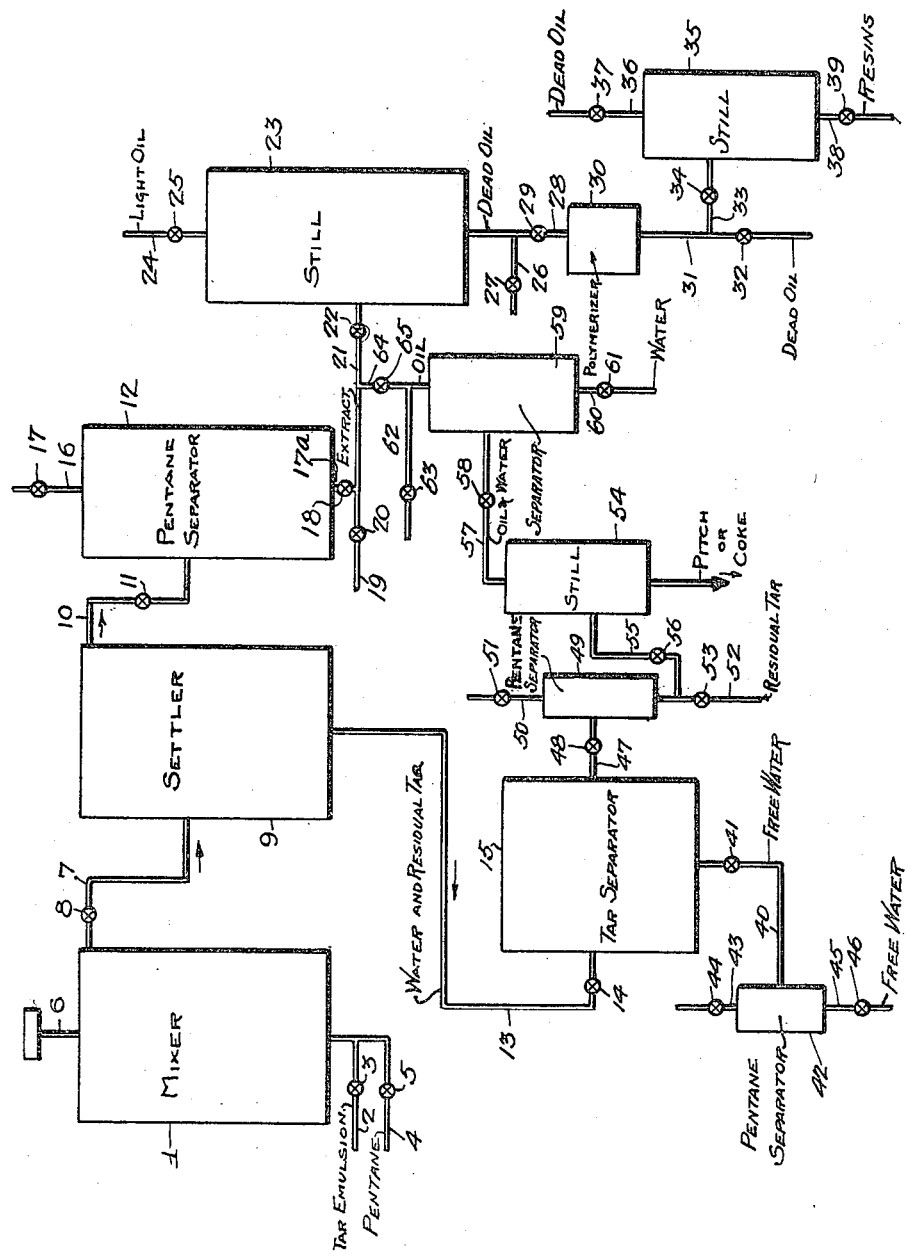
Inventor:
Howard R. Batchelder
by his Attorney.
Hugo G. Kennman Patented Aug. 21, 1945

2,383,363

UNITED STATES PATENT OFFICE 2,383,363

CHEMICAL PROCESS

Howard R. Batchelder, Drexel Hill, Pa., assignor to The United Gas Improvement Company, a corporation of Pennsylvania Application February 27, 1943, Serial No. 477,363

11 Claims. (Cl. 196—4)

The present invention relates to the separation of water from hydrocarbon-water emulsions.

More particularly, it relates to the separation of water from oil gas and carburetted water gas tar emulsions and the fractionation of hydrocarbon components thereof by means of liquid aliphatic hydrocarbon solvents containing from five and six carbon atoms per molecule.

In the manufacture of carburetted water gas and oil gas, petroleum oil is pyrolytically decomposed in vapor phase at relatively high temperatures in the presence of steam and/or other diluent gases.

Depending upon the cracking environment and the oil employed the decomposition of the oil may produce varying quantities of products ranging from hydrogen to carbon, including methane, ethane, ethylene, propane, propylene, butane, butylene, butadiene, cyclopentadiene, isoprene, piperylene, benzene, toluene, xylenes, styrene, methyl styrenes, indene, naphthalene, methyl naphthalene, anthracene, and other heavy aromatic hydrocarbons, condensed ring compounds of asphaltic character and other saturated and unsaturated compounds.

The more readily condensible compounds are normally removed from the gas by condensation and/or scrubbing or other means. The extent to which condensation and/or other removal is carried out varies. In some cases substantial quantities of benzene and toluene may remain in the gas. In other cases the removal may include substantially all the $C_4$ hydrocarbons such as butadiene, or may include $C_2$ hydrocarbons such as ethylene.

In the condensation of the hydrocarbons from the gas relatively large volumes of water vapor are also condensed and a part or all of the resultant water forms emulsions with the liquid hydrocarbons. In these tar emulsions the water is in the inner or dispersed phase with liquid hydrocarbon material constituting the outer phase or dispersion medium. The quantity of emulsion and its stability varies with the oil employed and with the oil cracking environment. The quantity of water in the emulsion may vary up to say 90% or higher, and emulsions of great stability may be formed from which little or no water separates by gravity on prolonged standing.

Various theories as to the causes of tar emulsion formation have been advanced. In general, it has been thought that primarily the emulsifying agent is a hydrocarbon substance possibly of asphaltene characteristics which assists the oil components in forming a membrane surrounding the water droplets and preventing their coalescence, that the toughness of the film determines the stability of the emulsion, and that the effect of the membrane is enhanced by the presence of free carbon.

Whatever may be the correctness of the various theories, the tar emulsions are formed and constitute a problem in the processing of tars of the class described, not presented in the processing of certain other tars such as coal gas tars, in which little, if any, trouble from tar emulsions is encountered.

The tar with relatively high water content is generally termed wet tar or tar emulsion. The hydrocarbon content of the wet tar or tar emulsion is termed dry tar and comprises light oil boiling up to about 210° C., dead oil and residual tar. In general, the volatile portion of the dry tar and especially the higher boiling fractions thereof are predominantly aromatic in character. This is in contrast to the products of relatively lower temperature fractional distillation of petroleum oil in which lubricating oil is a desired product and in which it is desired to preserve as much as possible the paraffinic characteristics of the lubricating oil fraction.

Tar emulsions have little value per se. Even for use as boiler fuel the water content should not be higher than 25%. The dry tar may have great value, particularly if the oil cracking has been carried on so as to produce relatively large quantities of valuable resin-forming hydrocarbons, such as for instance, butadiene, cyclopentadiene, isoprene and piperylene, styrene, methyl styrenes, indene and other unsaturated aromatic hydrocarbons, which may be accompanied by valuable quantities of saturated aromatics such as benzene, toluene, and xylenes.

Various methods of dehydrating wet tar of the class described have been proposed and employed including mechanical methods such as high speed centrifuging of hot tar; boiling to atmosphere to cause sufficient dehydration to produce boiler fuel, and distillation involving evaporation of substantially all the water content to produce dry tar and remove light oil and some dead oil. All such methods are relatively costly and not as effective in recovering valuable hydrocarbon constituents as the method of the present invention.

One object of the present invention is to provide an economical method of separating water from tar emulsions of the class described.

Another object of the present invention is to provide an economical method of separating the lighter hydrocarbon constituents of tars of the class described from the heavier hydrocarbon constituents of said tars.

Another object of my invention is the economical separation from the heavier hydrocarbon constituents of tars, of hydrocarbons not separated by ordinary methods of tar dehydration by distillation.

Another object of my invention is the separation from the residual tar of increased quantities of hydrocarbons boiling above 210° C.

Another object of my invention is the separation from the heavier residual tar components of valuable readily heat polymerizable unsaturated resin forming aromatic material boiling in the neighborhood of and above 210° C. and higher such as above 250° C. and 300° C.

Another object of my invention is the production from tars of the class described of residual tar with novel characteristics as distinguished from that obtained by distillation of the wet tar.

Other objects of the invention will appear as the specification proceeds and in connection with the description of the drawing which shows diagrammatically apparatus chosen for illustration by the use of which the invention may be practiced.

The present invention relates to the breaking of tar emulsions of the class described, the separation of water therefrom and the fractionation of the hydrocarbon component of the emulsion, by mixing said emulsions with liquid phase hydrocarbon material of more than four and less than seven carbon atoms per molecule. The very great majority of such hydrocarbons are normally liquid, that is, they are in liquid phase under standard conditions of temperature (60° F.) and absolute pressure (760 mm. Hg.). However, such hydrocarbons of 5 carbon atoms per molecule as neopentane (boiling point approximately 49° F.) are included in the scope of the invention.

Of such hydrocarbon solvents, it is preferred to employ aliphatic hydrocarbon materials as compared to alicyclic hydrocarbons and benzene.

Saturated hydrocarbons are more preferred than unsaturated hydrocarbons of the same number of carbon atoms per molecule.

Unsaturated hydrocarbons having 1 double bond are more preferred than unsaturated hydrocarbons having more unsaturation than 1 double bond.

Normal hydrocarbons are more preferred than branched chain hydrocarbons of the same number of carbon atoms per molecule and the same degree of saturation or unsaturation.

Hydrocarbons of 5 carbon atoms are more preferred than hydrocarbons of 6 carbon atoms of the same type.

In accordance with the foregoing, a solvent preponderantly comprised of material selected from the group of aliphatic hydrocarbons consisting of the pentanes, the amylenes, and the hexanes is particularly preferred.

Of these, the pentanes and the amylenes are still more particularly preferred. Furthermore, among the group consisting of pentanes and amylenes, the pentanes, namely, normal pentane, isopentane and neopentane are preferred, with normal pentane the most preferred.

Hydrocarbon solvents containing more than 6 carbon atoms per molecule are not recommended for carrying out the method of my invention in that among other things, separation by settling of the various phases formed becomes increasingly difficult as the molecular weight of the solvent is increased, so that with solvents containing more than 6 carbon atoms, the extracts obtained are greatly contaminated with pitch and separation is very poor.

When the higher boiling of the hydrocarbon solvents containing 5 or 6 carbon atoms per molecule are employed, higher temperatures are advisable to enhance water separation, but with an increase in temperature there usually is a decrease in viscosity of the residual tar and in the difference in specific gravity of the layers which makes phase separation more difficult.

The pentanes are particularly advantageous for use in the method of my invention in that they possess excellent emulsion breaking properties and the resultant phases may be readily separated after the de-emulsification step.

It is to be understood of course that the hydrocarbon solvents set forth above may be used in a substantially pure form or technical grades of the selected hydrocarbons may be employed, that is, the solvent may contain, in addition to a selected hydrocarbon, other hydrocarbons of similar nature, for example a liquid phase mixture comprised preponderantly of pentane but containing amylenes, butanes and/or hexanes and possibly impurities particularly in small amounts is an excellent solvent for use in the method of my invention.

As a further example, a liquid phase mixture comprised preponderantly of normal pentane but containing other pentanes such as isopentane and/or neopentane may be employed to great advantage.

The solvents may be used alone or in admixture with one another or in admixture with liquefied normally gaseous hydrocarbons, the employment of which for the separation of tar emulsions of the above described class, is described and claimed in my copending application Serial No. 353,034, filed August 17, 1940.

Examples of such normally gaseous hydrocarbons are ethane, ethylene, propane, propylene, butane such as normal and isobutane and butylene such as butene 1, butene 2 and isobutylene.

For example, liquid phase mixtures of propane and pentane, butane and pentane, butylene and pentane, may be advantageously employed as solvents in the practice of my invention.

For convenience, the invention will be described in further detail in connection with the employment of pentane, as the solvent.

The proportion of pentane to dry tar required for a given degree of separation of tar emulsion into water, oil and residual tar may vary with a number of factors including the chemical characteristics of the tar, the degree of mixing of pentane with the emulsion, the temperature and pressure at which the extraction is carried out, and the time of extraction. The desired degree of separation may vary also depending upon factors including facility of handling the residual tar precipitated by the extraction.

The chemical characteristics of the tar treated may vary depending upon the petroleum oil pyrolyzed, upon environmental factors of pyrolysis including temperature, time of contact, and the presence or absence of catalysts, and upon condensation factors such, for instance, as the extent to which condensation of materials from the gas is effected, and the degree of fractional condensation employed.

The invention may be readily practiced by batch or continuous operation.

Further features of the invention reside in the steps, combinations and sequences of steps, and in the construction, arrangement of and combination of parts, all of which together with other features will become more apparent to persons skilled in the art upon becoming familiar herewith and upon reference to the drawing which shows, somewhat diagrammatically, apparatus, chosen for illustration, in which the method of my invention may be performed, and in which:

Mixer 1 is shown provided with tar emulsion supply means such as connection 2, provided with valve 3, and pentane supply means 4, provided with valve 5. The mixer is preferably provided with means for securing intimate mixing of the emulsion and pentane such, for example, as is provided by a propeller mixer, the shaft of which is indicated at 6.

In the mixer at least a portion and preferably the bulk of the emulsion is broken by solution in pentane of hydrocarbons comprised in the outer phase of the emulsion. After the expiration of the desired time of mixing, which may be termed the time of extraction, the materials may be drawn off through connection 7, provided with valve 8, to the settler 9.

In the settler the mixture is permitted to settle and separate by gravity. Hydrocarbons dissolved in pentane are drawn off through connection 10 provided with valve 11 to the pentane separator 12.

The degree of separation in the settler may vary depending upon factors including the time of settling. Preferably, the separation is conducted so that the bulk of the dissolved hydrocarbons or extract and the bulk of the solvent may be drawn off without substantial inclusion of undissolved or precipitated material.

From the lower portion of the settler 9, undissolved or precipitated components of the emulsion comprising free water and residual tar may be drawn off through connection 13 provided with valve 14, and passed to separator 15. The free water and residual tar passed to separator 15 may be accompanied by a portion of the hydrocarbons dissolved in pentane, and the residual tar may include residual emulsion.

Returning to pentane separator 12, separator 12 may conveniently comprise a pentane still provided with suitable heating means (not shown), and adapted to distill pentane from the solution of hydrocarbons in pentane. The separator may be provided with suitable packing, if desired, and pentane may be refluxed to any desired degree.

The separated pentane may be withdrawn overhead through connection 16, provided with valve 17, and after condensation may be recycled to mixer 1, if desired.

It is to be understood, that the pentane so withdrawn may be treated, as by distillation or otherwise, for the removal of any material mixed therewith, which may have been derived from the tar, and which it is not desired to recycle.

The separated extract may be withdrawn from the lower portion of the separator 12 by way of connection 17a, provided with valve 18, and may be passed to storage or other disposal by way of connection 19, provided with valve 20 or may be passed by way of connection 21, provided with valve 22, to the still 23. Still 23 may be provided with any suitable heating means (not shown).

In still 23 the extract may be fractionally distilled in any desired degree, for instance, a separation may be effected between light oil boiling below about 210° C. and dead oil boiling above about 210° C. The light oil is removed overhead by way of connection 24, provided with valve 25, to storage, further fractionation, or other disposal.

In still 23, heat polymerizable aromatic resin-forming hydrocarbons boiling above 210° C. and present in the extract may, if desired, be polymerized at least in part. These resin-forming hydrocarbons are polymerized by heat in the usual tar distillation methods, and the resulting polymers become a part of and are lost in the residual tar in admixture with large proportions of intensely black pitch constituents therein. In the employment of the present invention, however, these heat polymerizable resin-forming hydrocarbons boiling above 210° C. may be present in large quantity in the extract and the polymerized resins, if produced during the fractionation into light oil and dead oil, may be readily separated therefrom.

The above mentioned resins and their production are described and claimed in copending application Serial Number 370,608, filed December 18, 1940, by Edwin L. Hall and Howard R. Batchelder.

From the lower portion of still 23 the dead oil which, if desired, may contain considerable quantities of polymerized resin formers as above described, may be withdrawn by way of connection 26, provided with valve 27, to storage or other disposal or may be passed by way of connection 28, provided with valve 29, to polymerizer 30.

Polymerizer 30 may be provided with any suitable heating means and in it the polymerization of the resin formers may be completed or continued to the desired degree, with or without the aid of catalysts.

From the polymerizer, the dead oil with the polymerized resin formers may be withdrawn by way of connection 31, provided with valve 32, to storage or other disposal, or may be passed by way of connection 33, provided with valve 34, to still 35. Still 35 may be provided with any suitable heating means (not shown) and may be operated at any desired pressure.

In still 35 the resins may be separated from the dead oil, the dead oil being taken off overhead by way of connection 36, provided with valve 37, to storage, further fractionation or other disposal. The resins may be withdrawn from the lower portion of the still 35 by way of connection 38, provided with valve 39, to storage, further treatment or other disposal.

The light oil boiling up to about 210° C., which may be recovered in connection with the use of my invention, may contain greatly increased quantities of heat polymerizable aromatic unsaturated hydrocarbons boiling in the range between the boiling point of indene and 210° C., as compared with the quantities in light oil produced by conventional methods of tar distillation. In ordinary tar distillation methods, these compounds are largely polymerized during the distillation, the polymers forming part of the residual tar from which they can be separated only with great difficulty, if at all. The resin formers or their polymers may be readily separated from the light oil when my invention is employed with a large increase in the yield of such compounds.

Returning to separator 15. In separator 15 residual tar, which may include residual emulsion and will normally be accompanied by pentane, may be conveniently separated from the free water released from the emulsion by the foregoing extraction by gravity settling under normal or elevator pressure. Pressures up to 100 lbs. per sq. in. gauge have been found convenient. On the other hand, pressure may be reduced, if desired, prior to settling. It is preferred however to avoid sudden reductions of pressure, which may cause a persistent dispersion of tar particles in the water, making complete separation of tar from water more difficult.

In the apparatus, chose for illustration, the settling may be conducted under pressure, the free water being drawn off from one portion of the separator as by way of connection 40, provided with expansion valve 41, and passed to separator 42. Pentane absorbed in the water and released by reduction in pressure may be flashed off and withdrawn by way of connection 43, provided with valve 44. Free water may be drawn off by way of connection 45, provided with valve 46, to waste or other disposal.

The residual tar which may include residual emulsion and may be accompanied by a portion of the hydrocarbons dissolved in pentane, may be withdrawn from separator 15 as by way of connection 47, provided with expansion valve 48, to separator 49. The reduction in pressure flashes off pentane from the material entering separator 49, the pentane being withdrawn by way of connection 50, provided with valve 51.

It will be understood that any low boiling material derived from the tar which separates with the pentane, may be removed therefrom by distillation or otherwise, should it not be desired to recycle such material.

The residual tar which may include residual emulsion and hydrocarbons separated from solution in pentane, may be withdrawn through connection 52, provided with valve 53 to storage or other disposal or may be passed, if desired, to still 54 by way of connection 55, provided with valve 56.

In still 54 the residual emulsion may be broken, residual water and oil may be separated by distillation from the pitch constituents of the residual tar, and removed overhead by way of connection 57, provided with valve 58, to separator 59. The pitch may be removed from the lower portion of the still by any convenient means (not shown). If desired, the distillation may be carried to coke which may be removed from the base of the still by any convenient means (not shown).

In separator 59 oil and water may be separated by gravity, the water withdrawn by way of connection 60, provided with valve 61 and the oil by way of connection 62, provided with valve 63, leading to storage or other disposal. If desired, the oil may be passed by way of connection 64, provided with valve 65, to still 23 together with the extract from separator 12.

The proportion of the emulsion broken and the proportion of oil separated from the heavy hydrocarbons of asphaltic character will depend, other conditions being equal, upon the employed ratio of pentane to dry tar. In order to facilitate the handling of the residual tar through the apparatus, it is preferred to leave in the precipitate sufficient oil to render the residual tar fluid.

Other conditions being equal, including the pentane-dry tar ratio, the yields of extract tend to increase with increasing operating temperatures and pressures.

Compromise may readily be effected between the relative advantages of low pentane-tar ratios and low pressure and temperature extraction conditions in effecting a desired degree of extraction.

I have found temperatures of the order of about 70° F. to 200° F. convenient when employing pentane as the solvent as they are accompanied by relatively moderate pressures of the order of from about 0 to 150 lbs. per square inch gauge, and normally require relatively moderate pentane-dry tar ratios. However, higher or lower temperatures are in no way precluded hereunder. Very low temperatures have the disadvantage of increasing the viscosity of the residual tar. Very high temperatures have the disadvantage of accompanying high pressures, and relatively poor phase separation.

When pentane is the solvent, temperatures between 80° F. and 170° F. are preferred with temperatures between 100° F. and 140° F. still more preferred.

As previously stated, other conditions being equal, the required pentane-dry tar ratio for a given degree of extraction varies with the chemical character of the dry tar. Apparently, the pentane ratio required varies directly as the average molecular weight of the dry tar, though this may not be true in every case.

Ratios of pentane to dry tar of from approximately 0.7 and lower to approximately 3 and higher by weight may be employed successfully in connection with tars of widely varying characteristics. The specific ratios given are for illustration. It is not intended to preclude in any way the employment of lower or higher ratios.

The following example of the operation of my invention may be cited.

*Example 1*

10.4 lbs. of tar emulsion containing 6.6 lbs. dry tar and 3.8 lbs. of emulsified water together with 6.6 lbs. of pentane were charged to the mixing chamber, heated to 115° F. and agitated for 45 minutes. After settling for approximately 20 minutes, 2.3 lbs. of separated water were drawn off, following this 11.2 lbs. of extract were removed which contained substantially all of the solvent employed, that is, approximately 4.5 lbs. of material were dissolved from the emulsion, leaving 2.1 lbs. of undissolved hydrocarbon material, an additional yield of approximately 0.6 lb. of oils were recovered by distillation of this undissolved hydrocarbon material.

Readily heat polymerizable unsaturated aromatic resin-forming material boiling above approximately 210° C. to the extent of 16.2% of the original dry tar was present in the extract.

The time of extraction may vary, it being understood that times of extraction sufficiently long to arrive at or near equilibrium require a lower pentane ratio for a given extraction than shorter times of extraction. The required time of extraction depends, other conditions being equal, upon the efficiency of mixing the emulsion and pentane.

Employing an efficient stirring device such as a "Turbo mixer," I have found times of extraction of the order of 10 to 20 minutes convenient. As previously indicated aliphatic hydrocarbons having five carbon atoms preferably form the major portion of the solvent employed hereunder and more preferably pentane forms the major portion of said solvent.

When other solvents are employed instead of pentane, factors such as character of the extracted and residual materials, pressure and temperature of operation, time of extraction and proportionate quantity of solvent employed may vary depending upon the solvent employed.

It may be advantageous under certain conditions to collect and treat separately the tars from different stages of fractional condensation of the gas. Such tars have different chemical characteristics and the character of the extract necessarily varies between such operations. The quantity of benzol present, for example, may modify the extraction and a relatively high percentage of benzol may cause the substantial solution of materials not dissolved to such an extent, if appreciably, in the presence of relatively small benzol concentrations.

Resins produced from the readily heat polymerizable unsaturated aromatic material boiling above approximately 210° C. present in the extract derived from the heavier condensate fractions tend to be lighter in color than those derived from lighter condensate fractions, when the same solvent is added for the extraction.

High benzol concentrations may be present because of cracking the petroleum oil in the presence of additional benzol as described and claimed by Newcomb K. Chaney in U. S. Patent Number 2,226,531, or benzol may be added to the emulsion if desired.

The residual tars produced in the employment of my invention differ materially from residual tars produced as a result of fractionating tar emulsions by distillation, because of the absence, in the residual tars produced hereunder, of large proportions of heat polymers which are produced in distilling tar emulsions.

The pitches produced on distilling the residual tars produced hereunder also differ materially from the pitches produced in cases in which the tar emulsions are fractionated by distillation, because of the separation from the tar, prior to the distillation of said tar to pitch, of substantial quantities of heat polymerizable unsaturates, which are present in the tar in cases in which the tar emulsions are fractionated by distillation.

The invention is not to be considered limited by any theory advanced as to the causes of tar emulsion formation or separation. Neither is the invention limited by the specific examples nor the specific embodiments of the invention chosen for illustration thereof, modifications of which will readily occur to those skilled in the art upon becoming familiar with the invention.

I claim:

1. A method for fractionating a tar emulsion comprised of water and tar produced in the pyrolysis of petroleum oil, said tar containing readily heat polymerizable resin-forming unsaturated aromatic hydrocarbon components boiling above 210° C., comprising mixing with said tar emulsion sufficient liquid aliphatic hydrocarbon solvent containing from 5 to 6 carbon atoms per molecule to dissolve in said solvent as a separate liquid phase hydrocarbon components of said tar emulsion including readily heat polymerizable resin-forming unsaturated aromatic hydrocarbon components boiling above 210° C., and separating said solvent containing readily heat polymerizable resin-forming unsaturated aromatic hydrocarbon components in solution from said water and from undissolved tar components including hydrocarbon components insoluble in said solvent.

2. A method for fractionating a tar-water emulsion produced in the pyrolysis of petroleum oil, said tar containing readily heat polymerizable resin-forming unsaturated aromatic hydrocarbon components boiling above 210° C., comprising mixing with said tar-water emulsion sufficient liquid aliphatic hydrocarbon solvent containing from 5 to 6 carbon atoms per molecule to dissolve in said solvent as a separate liquid phase hydrocarbon components of said tar including readily heat polymerizable resin-forming unsaturated aromatic hydrocarbon components boiling above 210° C. and to release water from said tar-water emulsion leaving undissolved heavy tar-water components including hydrocarbon components insoluble in said solvent.

3. The process of separating into phases mechanically separable by decantation a tar and water emulsion produced in the pyrolysis of petroleum oil and containing pitch admixed with aromatic resin-forming hydrocarbon unsaturates readily polymerizable by heat and boiling between 210° C. and 300° C. and other aromatic hydrocarbons in which one phase contains at least the larger part of said aromatic resin-forming hydrocarbon unsaturates in unpolymerized form admixed with other aromatic hydrocarbons, and another phase contains said pitch, comprising admixing with said tar-water emulsion an aliphatic hydrocarbon solvent comprised of aliphatic hydrocarbon material of between 5 and 6 carbon atoms per molecule and of no more unsaturation than one double bond per molecule in amount sufficient to cause the formation separate from said tar-water emulsion and separate from any free water of a liquid hydrocarbon phase comprising a solution in said solvent of at least the larger part of said aromatic resin-forming hydrocarbon unsaturates in unpolymerized form together with other aromatic hydrocarbons soluble in said solvent, while leaving the phase containing said pitch sufficiently fluid to be removed by decantation in effecting phase separation.

4. A method for fractionating a tar emulsion comprised of water and tar and resulting from the relatively high temperature pyrolysis in the presence of steam of petroleum oil, said tar containing readily heat polymerizable resin-forming unsaturated aromatic hydrocarbon components boiling between 210° C. and 300° C. and other aromatic hydrocarbon components, comprising intimately mixing with said tar emulsion sufficient aliphatic hydrocarbon solvent comprised of paraffinic hydrocarbon material of more than 4 and less than 7 carbon atoms per molecule to dissolve in said solvent as a separate liquid phase hydrocarbon components of said tar emulsion including the larger part of said readily heat polymerizable resin-forming unsaturated aromatic hydrocarbon components boiling between 210° C. and 300° C., and separating said solvent containing the larger part of said readily heat polymerizable resin-forming unsaturated aromatic hydrocarbon components boiling between 210° C. and 300° C. in solution from said water and from undissolved tar components including hydrocarbon components insoluble in said solvent.

5. A method for fractionating a tar emulsion comprised of water and tar and resulting from the relatively high temperature pyrolysis in the presence of steam of petroleum oil, said tar containing readily heat polymerizable resin-forming unsaturated aromatic hydrocarbon components boiling above 210° C., comprising intimately mixing with said tar emulsion sufficient aliphatic hydrocarbon solvent comprised of aliphatic hydrocarbon material of 5 carbon atoms per molecule and of no more unsaturation than one double bond per molecule to dissolve in said solvent as a separate liquid phase hydrocarbon components of said tar emulsion including readily heat polymerizable resin-forming unsaturated aromatic hydrocarbon components boiling above 210° C., and separating said solvent containing said dissolved readily heat polymerizable resin-forming unsaturated aromatic hydrocarbon components from said water and from undissolved tar components including hydrocarbon components insoluble in said solvent.

6. A method for fractionating a tar emulsion comprised of water and tar and resulting from the vapor phase pyrolysis in the presence of steam of petroleum oil, said tar having its volatile portion predominantly aromatic and containing readily heat polymerizable resin-forming unsaturated aromatic hydrocarbon components boiling above 210° C., comprising intimately mixing with said tar emulsion at a temperature between approximately 70° F. and 200° F. aliphatic hydrocarbon solvent comprised of aliphatic hydrocarbon material of 5 carbon atoms per molecule and of no more unsaturation than one double bond per molecule in a ratio to the tar content of said tar emulsion of between approximately 0.7 and 3 by weight to dissolve in said solvent as a separate liquid phase hydrocarbon components of said tar emulsion including readily heat polymerizable resin-forming unsaturated aromatic hydrocarbon components boiling above 210° C., and separating said solvent containing said dissolved readily heat polymerizable resin-forming unsaturated aromatic hydrocarbon components from said water and from undissolved tar components including hydrocarbon components insoluble in said solvent.

7. A method for fractionating a tar emulsion comprised of water and tar and resulting from the vapor phase pyrolysis in the presence of steam of petroleum oil, said tar containing readily heat polymerizable resin-forming unsaturated aromatic hydrocarbon components boiling above 210° C., comprising intimately mixing with said tar emulsion at a temperature between approximately 70° F. and 200° F. pentane in liquid phase in a ratio to the tar content of said tar emulsion of between approximately 0.7 and 3 by weight to dissolve in said pentane as a separate liquid phase hydrocarbon components of said tar emulsion including readily heat polymerizable resin-forming unsaturated aromatic hydrocarbon components boiling above 210° C. and separating said separate liquid phase containing pentane and said dissolved readily heat polymerizable resin-forming unsaturated aromatic hydrocarbon components from said water and from undissolved tar components including hydrocarbon components insoluble in said pentane.

8. A method for fractionating a tar-water emulsion produced in the pyrolysis of petroleum oil, said tar containing readily heat polymerizable resin-forming unsaturated aromatic hydrocarbon components boiling above 210° C., comprising intimately mixing with said tar-water emulsion at a temperature between approximately 70° F. and 200° F. aliphatic hydrocarbon solvent consisting preponderantly of pentane in amount such as to dissolve in said solvent as a separate liquid phase hydrocarbon components of said tar including readily heat polymerizable resin-forming unsaturated aromatic hydrocarbon components boiling above 210° C. and such as to release water from said tar-water emulsion leaving undissolved heavy tar components including hydrocarbon components insoluble in said solvent.

9. The process of separating into layers separable by decantation a tar and water emulsion resulting from the vapor phase pyrolysis of petroleum oil in the presence of steam and containing pitch admixed with aromatic resin-forming hydrocarbon unsaturates readily polymerizable by heat and boiling between 210° C. and 300° C. and other aromatic hydrocarbons in which one layer contains in unpolymerized form at least the larger part of said aromatic resin-forming hydrocarbon unsaturates boiling between 210° C. and 300° C. admixed with other aromatic hydrocarbons, and another layer contains said pitch, comprising intimately admixing with said tar-water emulsion aliphatic hydrocarbon solvent consisting preponderantly of aliphatic hydrocarbon material of 5 carbon atoms per molecule and of no more unsaturation than one double bond per molecule in amount such as to cause upon settling the formation separate from any free water of a liquid hydrocarbon layer comprising a solution in said solvent of at least the larger part of said aromatic resin-forming hydrocarbon unsaturates boiling between 210° C. and 300° C. in unpolymerized form together with other aromatic hydrocarbons soluble in said solvent, and such as to cause the formation of another layer containing said pitch.

10. The process of separating into layers separable by decantation a tar and water emulsion resulting from the condensation of a mixture of steam and products of the vapor phase pyrolysis of petroleum oil and containing pitch admixed with aromatic resin-forming hydrocarbon unsaturates readily polymerizable by heat and boiling between 210° C. and 300° C. and other aromatic hydrocarbons in which one layer contains in unpolymerized form at least the larger part of said aromatic resin-forming hydrocarbon unsaturates boiling between 210° C. and 300° C. admixed with other aromatic hydrocarbons, and another layer contains said pitch, comprising intimately admixing with said tar-water emulsion at a temperature between approximately 80° F. and 170° F. a paraffinic hydrocarbon solvent of 5 carbon atoms per molecule in amount such that the ratio of said hydrocarbon solvent to the tar content of said tar-water emulsion is between approximately 0.7 and 3 by weight to cause upon settling the formation separate from said tar-water emulsion and separate from any free water of a liquid hydrocarbon layer comprising a solution in said solvent of at least the larger part of said aromatic resin-forming hydrocarbon unsaturates boiling between 210° C. and 300° C. in unpolymerized form together with other aromatic hydrocarbons soluble in said solvent, while leaving the layer containing said pitch sufficiently fluid to be removed by decantation in effecting layer separation.

11. A method for fractionating a tar emulsion comprised of water and tar produced in the vapor phase pyrolysis of petroleum oil, said tar having its volatile portion predominantly aromatic and containing readily heat polymerizable resin-forming unsaturated aromatic hydrocarbon components boiling above 210° C., comprising intimately mixing with said tar emulsion aliphatic hydrocarbon solvent comprised of aliphatic hydrocarbon material of 5 to 6 carbon atoms per molecule in amount such as to dissolve therein as a separate liquid phase hydrocarbon components of said tar emulsion including readily heat polymerizable resin-forming unsaturated aromatic hydrocarbon components boiling above 210° C., and separating said separate liquid phase comprised of solvent and readily heat polymerizable resin-forming unsaturated aromatic hydrocarbon components boiling above 210° C. from said water and from undissolved tar components including hydrocarbon components insoluble in said solvent.

HOWARD R. BATCHELDER.